United States Patent [19]

Shimada et al.

[11] Patent Number: 4,847,959
[45] Date of Patent: Jul. 18, 1989

[54] FEMALE UNIT OF A SNAP FASTENER

[75] Inventors: Tsuneyuki Shimada; Masaru Iguchi, both of Yao, Japan

[73] Assignee: Kane-M Industrial Co., Ltd., Osaka, Japan

[21] Appl. No.: 143,304

[22] Filed: Jan. 11, 1988

Related U.S. Application Data

[63] Continuation of Ser. No. 889,344, Jul. 25, 1986, abandoned.

[30] Foreign Application Priority Data

Dec. 28, 1985 [JP] Japan ............................. 60-204195

[51] Int. Cl.⁴ .............................................. A44B 17/00
[52] U.S. Cl. ........................................ 24/671; 24/662; 24/681
[58] Field of Search .................. 24/104, 106, 107, 108, 24/618-624, 662-679, 680-682, 687, 696, 659, 689-693

[56] References Cited

U.S. PATENT DOCUMENTS

| | | |
|---|---|---|
| D. 138,023 | 6/1944 | Walker . |
| D. 247,468 | 3/1978 | Morita . |
| D. 274,883 | 7/1984 | Aoki . |
| D. 283,484 | 4/1986 | Aoki . |
| D. 289,137 | 4/1987 | Aoki . |
| 774,382 | 11/1904 | Engle . |
| 2,312,443 | 3/1943 | Reiter ............................. 24/681 X |
| 2,838,820 | 9/1954 | Hakanson . |
| 3,083,430 | 10/1960 | Shears . |
| 3,301,296 | 1/1967 | Meyer ............................. 24/662 X |
| 3,416,200 | 12/1968 | Daddona, Jr. ................... 24/662 |
| 3,454,993 | 8/1967 | Jacobson . |
| 3,540,086 | 11/1970 | Ngsten ........................... 24/687 |
| 3,551,963 | 1/1971 | Mosher, Jr. et al. ............ 24/662 X |
| 3,564,673 | 2/1971 | Daddona, Jr. ................... 24/692 X |
| 3,614,819 | 5/1969 | Nysten . |
| 3,916,756 | 11/1975 | Yoda ............................... 24/683 X |
| 3,958,307 | 5/1976 | Ishizaki . |
| 4,021,891 | 5/1977 | Morita . |
| 4,246,679 | 1/1981 | Monett . |
| 4,404,713 | 9/1983 | Dorsey . |
| 4,509,232 | 4/1985 | Kanzaka ........................ 24/662 X |
| 4,562,624 | 1/1986 | Kanzaka ........................ 24/681 x |

OTHER PUBLICATIONS

Publication "Luggage & Leather Goods", Mar., 1959, p. 12.

Primary Examiner—James R. Brittain
Attorney, Agent, or Firm—Birch, Stewart, Kolasch & Birch

[57] ABSTRACT

A female member of a snap fastener comprising a holding part to be retained on material and a fitting part provided with a through-hole substantially at its center for closely contacting a fitting head of a male body of the snap fastener. The holding part includes an upper edge inclined to accept the fitting head of the male body and is molded with an elastic synthetic resin in one unit. Since the fitting convex part is inclined in the direction for receiving the fitting head of the male body, it is easy for the fitting head of the male body to slip into the through-hole when inserting the fitting head of the male body, thereby facilitating engagement.

8 Claims, 5 Drawing Sheets

FEMALE UNIT OF A SNAP FASTENER

This application is a continuation, of application Ser. No. 889,344 filed on July 25, 1986, abandoned.

BACKGROUND OF THE INVENTION

1. Field of the Invention

The present invention relates to a female member of a snap fastener which is fixed to material such as cloth or leather, and is to be connected to a male body that is fixed to another place by engagement in a freely attachable-detachable manner.

2. Description of the Prior Art

Conventionally, for snap fasteners that are sold on the market, snap fasteners fastened by a spring are generally used. There are also ring-type hooks fastened by a ring and the like are present. However, since all of them are made of metal, it is technically difficult to minutely determine the fastening strength of the spring used for the hook. Also, it is difficult that a metal wire material is processed in a predetermined shape as a spring material for the snap fastener for later being pressed into a predetermined position within the snap fastener body.

Taking these difficulties into account and for the purpose of simplifying the manufacturing process, it has been considered to devise a snap fastener using an elastic disc made of a synthetic resin in place of using a steel wire.

SUMMARY OF THE INVENTION

As for an elastic disc made of synthetic resin (material to be used as the spring) having a continuous thickness, it is difficult to obtain a suitable fastening strength of a spring. In other words, if the thickness are increased to obtain a higher spring constant, it will be difficult for the male body to be pressed into the through-hole of the elastic disc. On the contrary, if the thickness is reduced for easy engagement, it is liable to come out easily.

In addition, if the main surface of the elastic disc is formed flat, the inserting position as well as the inserting direction will not facilitate pressing the projection of the male body into the through-hole.

For this reason, a principal object of the present invention is, therefore, to offer a female member of a snap fastener capable of being fixed firmly on a holding material such as cloth or leather material or the like, being able to change the fastening strength of the spring by easily varying the spring constant corresponding with the properties of the holding material or the functions of the snap fastener, and easily facilitating the engagement of the male body.

The present invention relates to a female member of a snap fastener molded in one unit for its holding part and fitting part with a synthetic resin of elastic property, comprising the holding part to be retained on the holding material, the fitting part extending toward the center of the holding part, wherein a through-hole contacting a fitting head of a male body is formed generally in the center thereof, wherein its upper edge being inclined in an inserting direction of the fitting head of the male body is formed.

According to the present invention, with the upper edge of the fitting convex part being inclined to the inserting direction of the fitting head of the male body, the fitting head of the male body of the snap fastener can be slipped into the through-hole when it is inserted into the female member for engagement.

Since the holding part and the fitting part are made of a synthetic resin and molded in one unit, the strength of the spring force may be determined merely by changing the molding die of the synthetic resin. Besides, a synthetic resin having a relatively high moldability being selected, its molded form can be adaptable to the functional requirements as a whole or in part.

Furthermore, since the upper edge of the fitting convex part is inclined in the inserting direction of the fitting head of the male body, when inserting the fitting head of the male body, it tends to slip into the through-hole, thereby facilitating the engagement.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
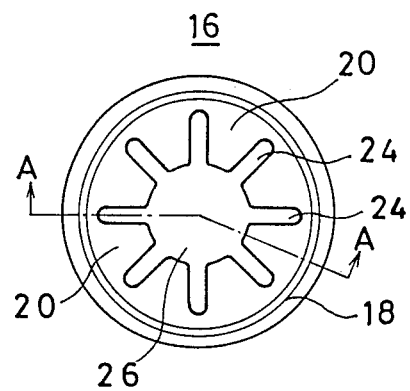
FIG. 1 is a plan view showing one embodiment of the present invention.
Figure 2:
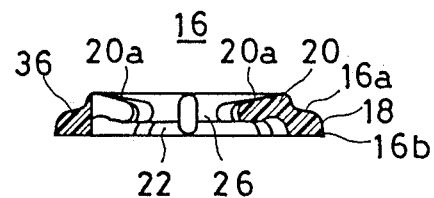
FIG. 2 is a cross-sectional view along the line A—A of the embodiment of FIG. 1.
Figure 3:
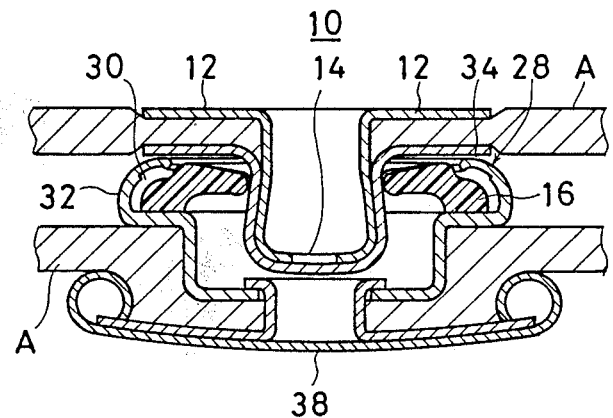
FIG. 3 is a cross-sectional view of the embodiment of FIG. 1.

As shown in FIGS. 1-3 the snap fastener 10 comprises a female member 16 which is engageable with a male body 12 and a fitting head 14 of the male body 12 in a freely attachable-detachable manner.

The female member 16 includes a holding part 18 which is to be held on a holding material A such as cloth or leather material or the like, and a fitting part 20 projecting at the upper edge of the holding part 18. The female member 16 including the holding part 18 are made of an elastic synthetic resin, for example, polyacetal and molded in one-piece.

On the upper edge of the peripheral edge on the side of a cavity 22 of the holding part 18, the thin fitting part 20 protruding from the aforementioned holding part 18 toward the center of the cavity 22 is formed as shown in FIG. 1. The fitting part 20 is divided by grooves 24 forming a plurality of male body engaging members 17.

A through-hole 26 is formed substantially in the center of the fitting part 20 for inserting the fitting head 14 of the male body 12 in a freely attachable-detachable fashion. The periphery of the fitting part 20 on the side of the through-hole 26 is formed in a circular arc in cross-section as shown in FIG. 1.

The upper edge 20a of the fitting part 20 is inclined in the inserting direction of the fitting head 14 of the male body 12. That is, it is formed in such a manner that, when the fitting head 14 of the male body 12 is inserted, it will slip on the upper edge 20a of the fitting convex part 20 and further into the through-hole 26.

The fitting convex part 20 of the embodiment is totally formed in a tongue shape and divided in small sections by the grooves 24.

Accordingly, when the fitting head 14 of the male body 12 is inserted into the through-hole 26, each male body engaging member 17 tends to bend in the inserting direction of the male body 12 and move radially of the female member 16 due to the incoming fitting head 14 of the male body 12, thereby being slightly extended radially and causing the width of the grooves 24 to increase a little. Thus, the contact area between the fitting head 14 of the male body 12 and the fitting part 20 of the female member 16 is enlarged and the tensile force is increased.

Moreover, in the embodiment, the fitting part 20 and the holding part 18 are formed with a cavity, so that when the fitting head 14 of the male body 12 is inserted, each fitting part 20 will slightly extend radially of the female member 16, thereby increasing the retaining force of the female member 16 against the male body 12.

Since the fitting part 20 is slightly inclined in the inserting direction of the fitting head 14, of the male body 12 as a whole, and arranged in series on the holding part 18, when inserting the male body 12 the fitting head 14 thereof tends to engage readily, and when disengaging it shows certain resistance, thus the retaining force against the male body 12 is secured.

The female member 16 is displaceably fixed within the holding part 18 in a housing body 28 designed to fix the female member 16 on the holding material A.

That is, a mounting part 30 of the housing body 28 retaining the holding part 18, is formed to produce a gap between the upper edge 16a and the peripheral edge 16b of the female member 16.

The housing body 28 includes a holding edge 34 formed by bending an end portion extending from a tubular periphery 32 and formed slightly thin as shown in FIG. 3. A step 36 formed on the upper peripheral edge of the holding part 18 of the female body 16 is held by the aforementioned holding edge 34, and when the whole holding part 18 is substantially inserted into and fixed by the mounting part 30 of the housing body 28, the gap is produced between the holding edge 34 and the step 36, and between the tubular periphery 32 of the housing body 28 and the peripheral edge 16b.

Accordingly, when the fitting head 14 of the male body 12 is inserted into the female member 16, the lowermost flat surface of the holding part 18 of the female member 16 tends to slide on the flat floor of the mounting part 30 of the housing body 28 and the holding part 18 and is slightly extended within the mounting part 30 to engage the male body 12 firmly.

Meanwhile, in the embodiment, as the uppermost surface of the tubular periphery 32 and the holding edge 34 of the housing body 28 are formed to be located higher than the uppermost surface of the female member 16, when ironing, the iron will only contact the tubular periphery 32 and the holding edge 34 of the housing body 28 but not directly the female member 16. Thus, the female member 16 may be hardly deformed even though it is made of a material having a relatively low heat resistance.

For fixing the female member 16 on the holding material A, the housing body 28 holding the female member 16 may be fixed with a separate fixing member 38 by clamping the holding material A therebetween.

Figure 4:
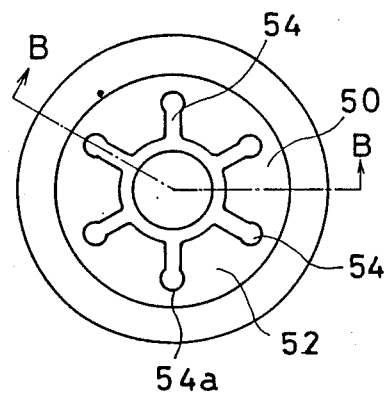
FIG. 4 is a plan view showing a modified embodiment of FIG. 1.
Figure 5:
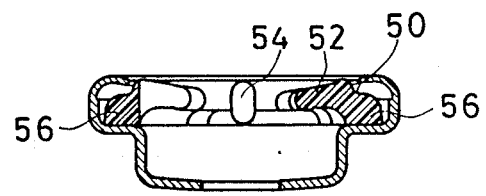
FIG. 5 is a cross-sectional view along the line B—B of the example shown in FIG. 4.

FIGS. 4 and 5 show the modified embodiment of the aforementioned embodiment of FIG. 1, wherein FIG. 4 is a plan view and FIG. 5 is a cross-sectional view along the line B—B thereof.

In female member 50, an grooves 54 dividing an fitting part 52 is cut out in a circular arc shape at the base portion 54a on the side of a holding part 56, and formed so as to be able to control the engaging and disengaging strength of the fitting head of the male body.

Figure 6:
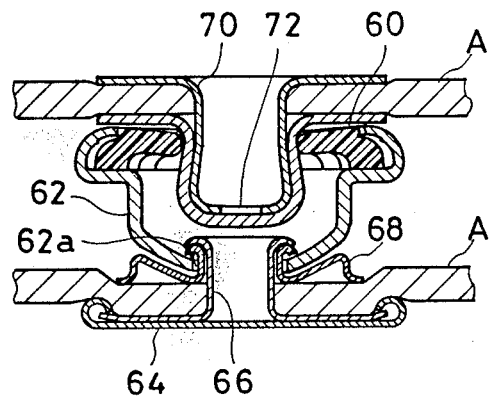
FIG. 6 is a cross-sectional view showing a female unit of another modified embodiment of FIG. 1.
Figure 7:
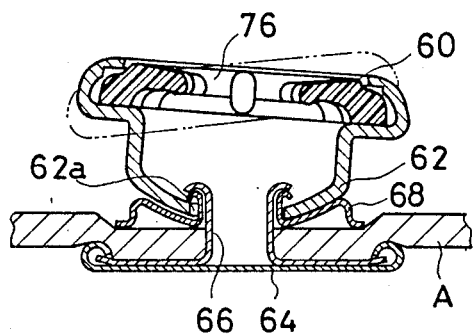
FIG. 7 is a cross-sectional view showing the operation of the embodiment shown in FIG. 6.

FIGS. 6 and 7 show a female unit of a further modified embodiment of FIG. 1, wherein FIG. 6 is a cross-sectional view and FIG. 7 is a cross-sectional view showing its operation. A housing body 62 holding a female member 60 is provided with a hole 62a at the rear end thereof. On holding member 64, a spherical seat member 68 is fixed at its neck 66 so as to clamp the holding material A therebetween. The aforementioned housing body 62 is fixing to the neck of the spherical seat member 68 freely tiltable in the hole 62a for connection with a holding member 64.

Thus, as shown in FIG. 7, the housing body 62 is adapted to tilt about the neck 66 of the holding member 64, and when a fitting head 72 of male body 70 is inserted, is tilted to facilitate the engagment with through-hole 76 of the female member 60.

In the embodiment mentioned above, the fitting part extends toward the through-hole to form a dual spring snap fastener construction.

Figure 8:
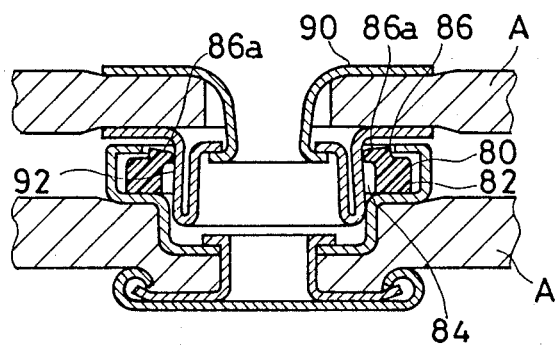
FIG. 8 is a cross-sectional view showing a further embodiment of the present invention.
Figure 9:
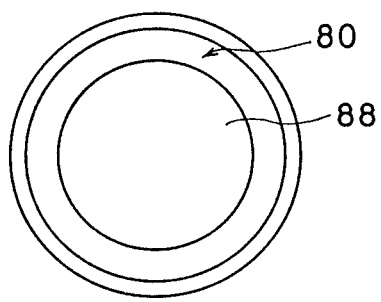
FIG. 9 is a plan view of the embodiment of FIG. 8.
Figure 10:
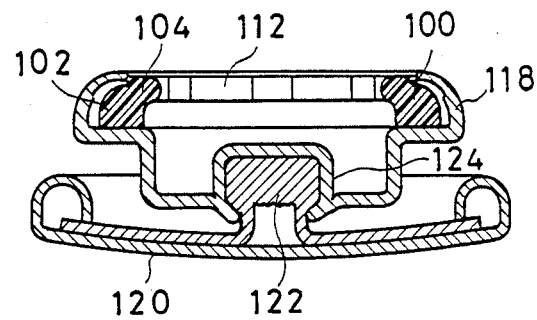
FIG. 10 is a cross-sectional view showing still another embodiment.
Figure 11:
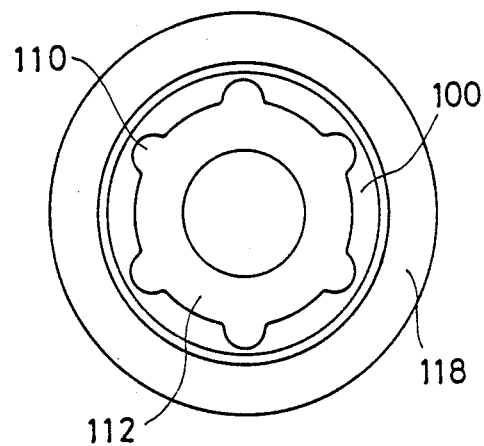
FIG. 11 is a plan view of the embodiment of FIG. 10.
Figure 12:
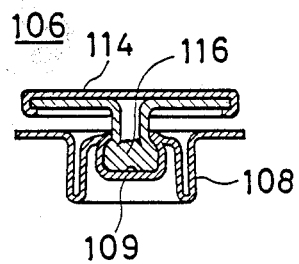
FIG. 12 is a cross-sectional view of a male body used in the embodiment of FIG. 10.
Figure 13:
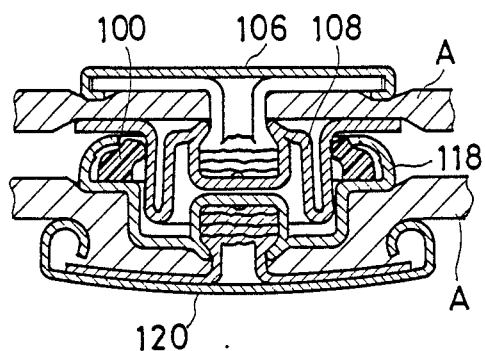
FIG. 13 is a cross-sectional view showing an application of the embodiment of FIG. 10.

FIGS. 8 and 9 show a snap fastener other than the aforementioned embodiment, wherein FIG. 8 shows a cross-sectional view and FIG. 9 shows a plan view thereof. A female member 80 includes a holding part 82 having a square cross-section, and a thin fitting part 86 extending from the aforementioned holding part 82 at the upper edge of the periphery on the side of a cavity 84, toward the center thereof as shown in FIG. 8. The fitting part 86 is substantially formed in a square as a whole, and its upper edge 86a is inclined as same as the aforementioned embodiments, toward through-hole 88 or in an inserting direction of a fitting head 92 of a male body 90. That is, it is formed in such a way that, the fitting head 92 of the male body 90 having a larger diameter than the through-hole 88 slides on the upper edge of the fitting convex part 86 to a position in the center thereof, and to facilitate the engagement of the fitting head 92 of the male body 90.

FIGS. 10 through 13 show a hook of a further embodiment. A female member 100 includes a fitting part 104 extending more upwardly at the upper end of a holding part 102 thereof. The upper edge of the fitting part 104 is, for the purpose of facilitating the engagement of a male body 106, inclined to allow an fitting head 108 of the male body 106 to slip in, as same as the embodiments previously described.

The fitting convex part 104 is divided in small sections with grooves 110 provided therebetween, and formed in such a manner that, when the fitting head 108 of the male body 106 is inserted into 112, each fitting convex part 104 tends to bend in the inserting direction of the male body 106 as well as radially of the female member 100.

Meanwhile, in the embodiment, the male body 106 includes a cylindrical fixing piece 116 of a fixing member 114 pressed into a fixing slot 109 in the fitting head 108 thereof, which may be compressed to fix the holding material A on the fitting head 108.

On a housing body 118 fixing the female member 100, as same as the male body 106, a fixing slot 124 having an opening into which a fixing piece 122 is to be inserted is formed. When the fixing piece 122 of the fixing member 120 is pressed into and compressed within the fixing slot 124 of the housing body 118, the fixing member 120 will be fixed on the housing member 118, thereby fixing the female member on the holding material A.

Figure 14A:
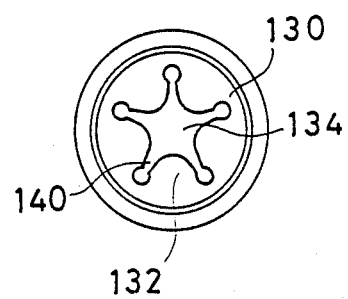
FIGS. 14A, 14B and 14C are plan views of other embodiments.
Figure 14B:
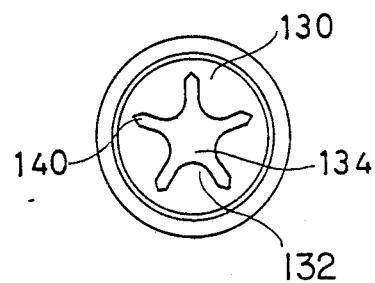
Figure 14C:
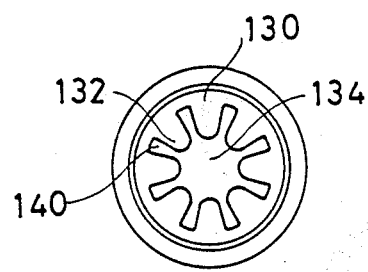

FIGS. 14A through 14C are plan views showing further embodiments. In the embodiments shown in FIGS. 14A through 14C, a male body engaging member 132 of a fitting part 130 is expanding at the tip on the side of through-hole 134, toward the center thereof to contact the fitting head of the male body at one point, and formed generally in a circular-arc-shaped plan. Accordingly, when the fitting head of the male body is inserted into the through-hole 134 in the female member, it may be engaged smoothly and fixed.

Figure 15:
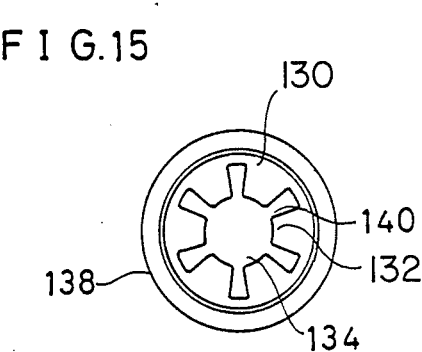
FIG. 15 is a plan view of another embodiment.

FIG. 15 shows still another modified embodiment. A fitting piece 136 shown in FIG. 15 is formed wider at the base portion on the side of a holding part 138 as compared with the tip on the side of 134, while grooves 140 are reversely formed wider on the side of the holding part 138, thereby reducing the spring constant in the inserting direction of the male body.

As illustrated in FIGS. 14A and 14B, where an odd number of grooves 140 dividing the fitting convex part are formed, with an odd number of fitting pieces 132 divided thereby are extending, even if the female member is molded to have a somewhat rough contact rate against the fitting head of the male body, a relatively high contact rate may be obtained as compared with a female member having an even number of fitting pieces.

As to the material forming the female member of the hook, besides the aforementioned examples, an elastic synthetic resin, for example, such as polyamide, polypropylene and the like may be suitably selected according to the application.

Furthermore, by suitably changing the plan or cross-sectional shape, their thickness, the number of grooves and so on of the fitting part, the strength of the spring may be changed accordingly to the respective applications. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A female unit of a snap fastener comprising:
   a substantially cylindrical shaped housing body having an opening for receiving a male body member and means for attaching said housing body to a layer of holding material, said housing body having an inner flat surface portion, an inner tubular periphery, and a retaining edge at said opening bent towards the center of said housing body; and
   a one-piece female member made of an elastic synthetic resin retained within said housing body, said female member including;
      a ring shaped holding portion engaging said flat surface portion of said housing body, said holding portion having a rounded outer upper peripheral portion for fitting within the inner tubular periphery of said housing body, and having a thickness less than the distance between said retaining edge and said flat surface portion of said housing body for providing a substantially uniform width gap between the holding portion and the inner tubular periphery of the housing body at both the outer peripheral side and upper surface of said holding portion,
      a thin disc shaped fitting portion having a downwardly arched shape formed within the inner diameter of said holding portion, said fitting portion having a single through-hole at its center and a plurality of grooves radially extending within said fitting portion to form a plurality of downwardly arched and inwardly extending male body engaging members, and
   a narrowed fulcrum portion formed between said fitting portion and said holding portion, said narrowed fulcrum portion enabling said plurality of male body engaging members to move in an insertion and removal direction of said male body member with respect to said holding portion;
   wherein each of said plurality of male body engaging members bend in the insertion direction and moves radially within said gap upon insertion of said male body member.

2. The female unit according to claim 1, wherein said elastic synthetic resin is selected from the group of polyacetal, polyamide and polypropylene.

3. The female unit according to claim 1, wherein said grooves have a rounded shape adjacent the outer periphery of said fitting part.

4. The female unit according to claim 1, wherein the thickness of said fitting portion gradually increases from said through-hole to said narrowed fulcrum portion.

5. A female unit of a snap fastener comprising:
   a female member made of an elastic synthetic resin and including:
      a holding portion having a rounded outer tubular periphery, and
      a fitting portion extending inwardly from said holding portion whereby said fitting portion is formed as a disc and is downwardly arched in a direction in which a male body is pressed with a root of said fitting portion acting as a fulcrum with said fulcrum being of a thickness less than either of said fitting portion or said holding portion, said fitting portion being provided with a single through-hole substantially at its center for closely fitting a head of the male body and a plurality of grooves radially extending within said fitting portion to form a plurality of inwardly extending male body engaging members of a substantially uniform thickness; and a housing for retaining said female member, said housing having a planar retaining surface in contact with a planar bottom portion of said female member and an inner tubular periphery surrounding but spaced a predetermined distance from said holding portion to enable radial expansion of said female member within said housing portion upon insertion of said male body member.

6. The female unit of a snap fastener according to claim 5, wherein said holding portion is provided with a cavity in its body for containing the head of the male body.

7. The female member of a snap fastener according to claim 5, wherein a step part formed on an outer peripheral wall surface of said holding portion is held by a holding edge of a mounting part of said housing body.

8. The female unit according to claim 5, wherein the thickness of said fitting portion gradually increases from said through-hole to said fulcrum.

* * * * *